(12) United States Patent
Ryu et al.

(10) Patent No.: US 7,817,335 B2
(45) Date of Patent: Oct. 19, 2010

(54) MICROSCOPE APPARATUS

(75) Inventors: Go Ryu, Kawasaki (JP); Masato Yabe, Hachioji (JP); Norio Maruyama, Hachioji (JP); Terumasa Morita, Hachioji (JP); Daisuke Yokoi, Tokorozawa (JP)

(73) Assignee: Olympus Corporation, Tokyo (JP)

( * ) Notice: Subject to any disclaimer, the term of this patent is extended or adjusted under 35 U.S.C. 154(b) by 446 days.

(21) Appl. No.: 11/933,553

(22) Filed: Nov. 1, 2007

(65) Prior Publication Data

US 2009/0219614 A1 Sep. 3, 2009

(30) Foreign Application Priority Data

Nov. 7, 2006 (JP) ............................. 2006-301974

(51) Int. Cl.
 *G02B 21/06* (2006.01)
(52) U.S. Cl. ................................................... 359/385
(58) Field of Classification Search ................ 359/368, 359/385, 388; 382/162–167; 356/302, 303, 356/306, 311, 317
See application file for complete search history.

(56) References Cited

U.S. PATENT DOCUMENTS 7,145,652 B2 * 12/2006 Moehler et al. ............. 356/336
7,158,294 B2 * 1/2007 Motomura et al. .......... 359/385
7,257,289 B2 * 8/2007 Oschewski ................... 385/27
7,319,520 B2 * 1/2008 Olschewski ................ 356/329
7,326,899 B2 * 2/2008 Ri ........................... 250/201.3
7,593,158 B2 * 9/2009 Wilhelm et al. ............. 359/385

FOREIGN PATENT DOCUMENTS

| JP | 2002-090640 A | 3/2002 |
| JP | 2003-322801 A | 11/2003 |
| JP | 2006-154237 A | 6/2006 |

* cited by examiner

*Primary Examiner*—Frank G Font
(74) *Attorney, Agent, or Firm*—Holtz, Holtz, Goodman & Chick, PC

(57) ABSTRACT

A microscope apparatus including a light source device, a storage table, and a setting controller is provided. The light source device includes a light intensity adjuster which changes light intensity of an illumination light of plural different wavelength regions selectively extracted from light emitted from a light source, and thereby emitting the illumination light including light of the plural different wavelength regions in such a manner that a light intensity ratio of light of one wavelength region to light of another wavelength region is variable. The storage table stores therein set values of the light intensity adjuster for each of combination patterns of the wavelength regions of the illumination light emitted from the light source device. The setting controller makes the light source device change a setting of the light intensity adjuster based on the set value stored in the storage table according to wavelength designation information which designates a combination pattern of the wavelength regions.

11 Claims, 10 Drawing Sheets

FIG.3

| COMBINATION PATTERNS OF WAVELENGTH REGIONS | | | SET VALUES OF ND FILTERS (TRANSMITTANCE [%]) | | | |
|---|---|---|---|---|---|---|
| FIRST WAVELENGTH REGION | SECOND WAVELENGTH REGION | THIRD WAVELENGTH REGION | BATCH ND FILTER | FIRST ND FILTER | SECOND ND FILTER | THIRD ND FILTER |
| × | × | × | — | — | — | — |
| × | × | ○ | 100 | — | — | 50 |
| × | ○ | × | 100 | — | 60 | — |
| × | ○ | ○ | 50 | — | 60 | 50 |
| ○ | × | × | 100 | 100 | — | — |
| ○ | × | ○ | 50 | 100 | — | 50 |
| ○ | ○ | × | 50 | 100 | 60 | — |
| ○ | ○ | ○ | 33 | 100 | 60 | 50 |

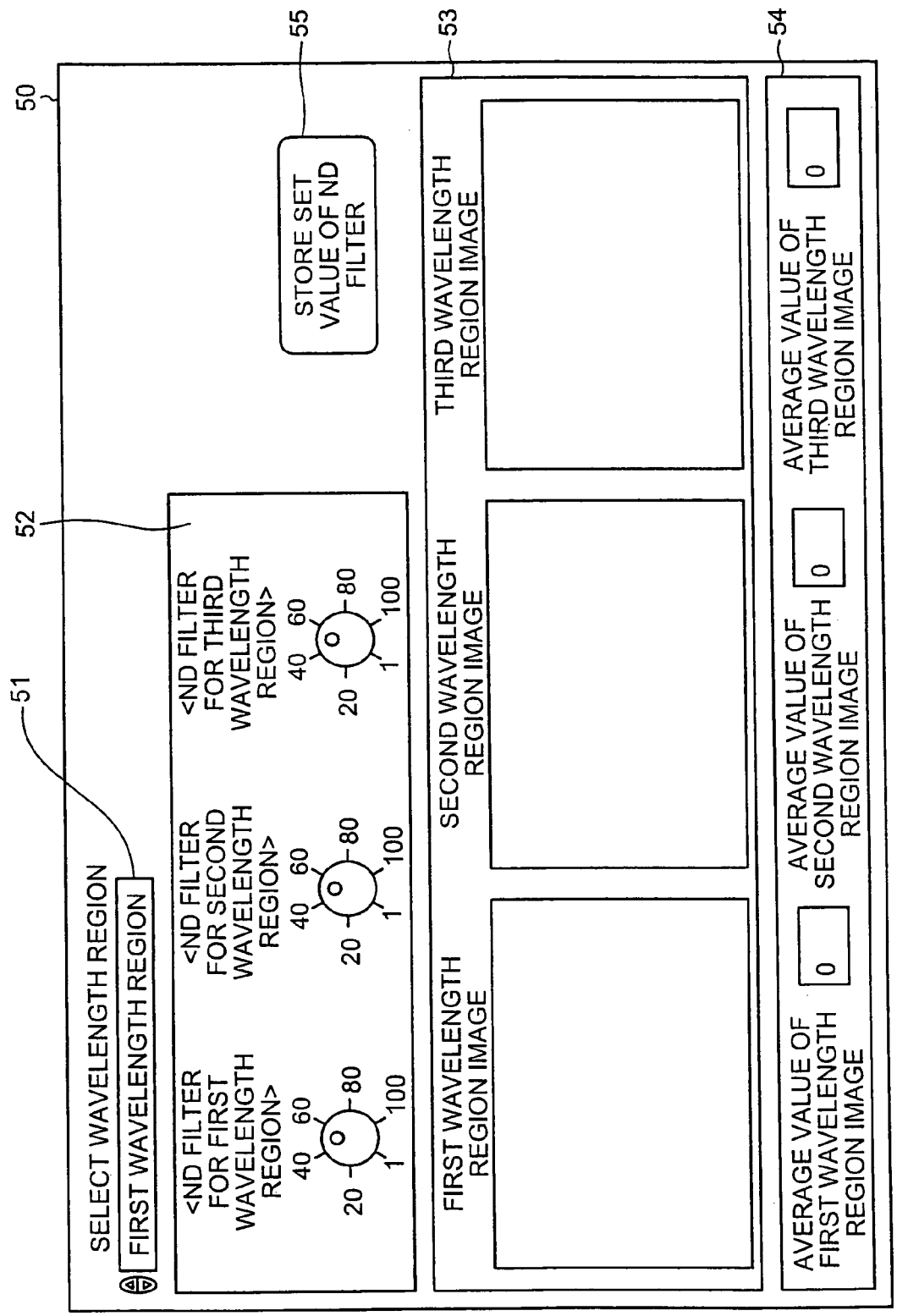

FIG.6

| COMBINATION PATTERNS OF WAVELENGTH REGIONS | | | SET VALUES OF ND FILTERS (TRANSMITTANCE [%]) | | | |
|---|---|---|---|---|---|---|
| FIRST WAVELENGTH REGION | SECOND WAVELENGTH REGION | THIRD WAVELENGTH REGION | BATCH ND FILTER | FIRST ND FILTER | SECOND ND FILTER | THIRD ND FILTER |
| × | × | × | - | - | - | - |
| × | × | ○ | 100 | - | - | 50 |
| × | ○ | × | 100 | - | 60 | - |
| × | ○ | ○ | 100 | - | 30 | 25 |
| ○ | × | × | 100 | 100 | - | - |
| ○ | × | ○ | 100 | 50 | - | 25 |
| ○ | ○ | × | 100 | 50 | 30 | - |
| ○ | ○ | ○ | 100 | 33 | 20 | 17 |

FIG.7

| COMBINATION PATTERNS OF WAVELENGTH REGIONS | | | SET VALUES OF ND FILTERS (TRANSMITTANCE [%]) | | | |
|---|---|---|---|---|---|---|
| FIRST WAVELENGTH REGION | SECOND WAVELENGTH REGION | THIRD WAVELENGTH REGION | BATCH ND FILTER | FIRST ND FILTER | SECOND ND FILTER | THIRD ND FILTER |
| × | × | ○ | 50 | - | - | 100 |
| × | ○ | × | 60 | - | 100 | - |
| ○ | × | × | 100 | 100 | - | - |

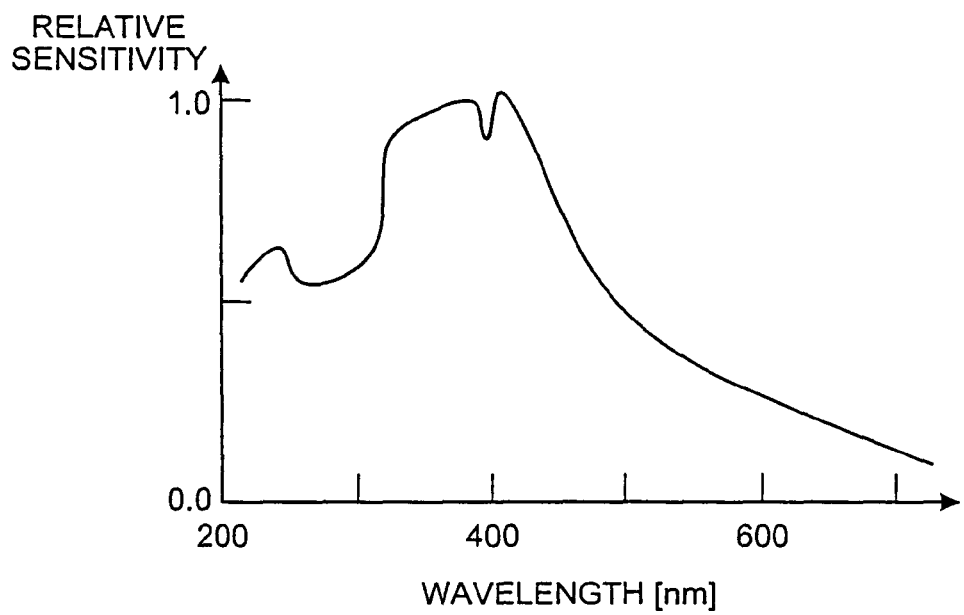

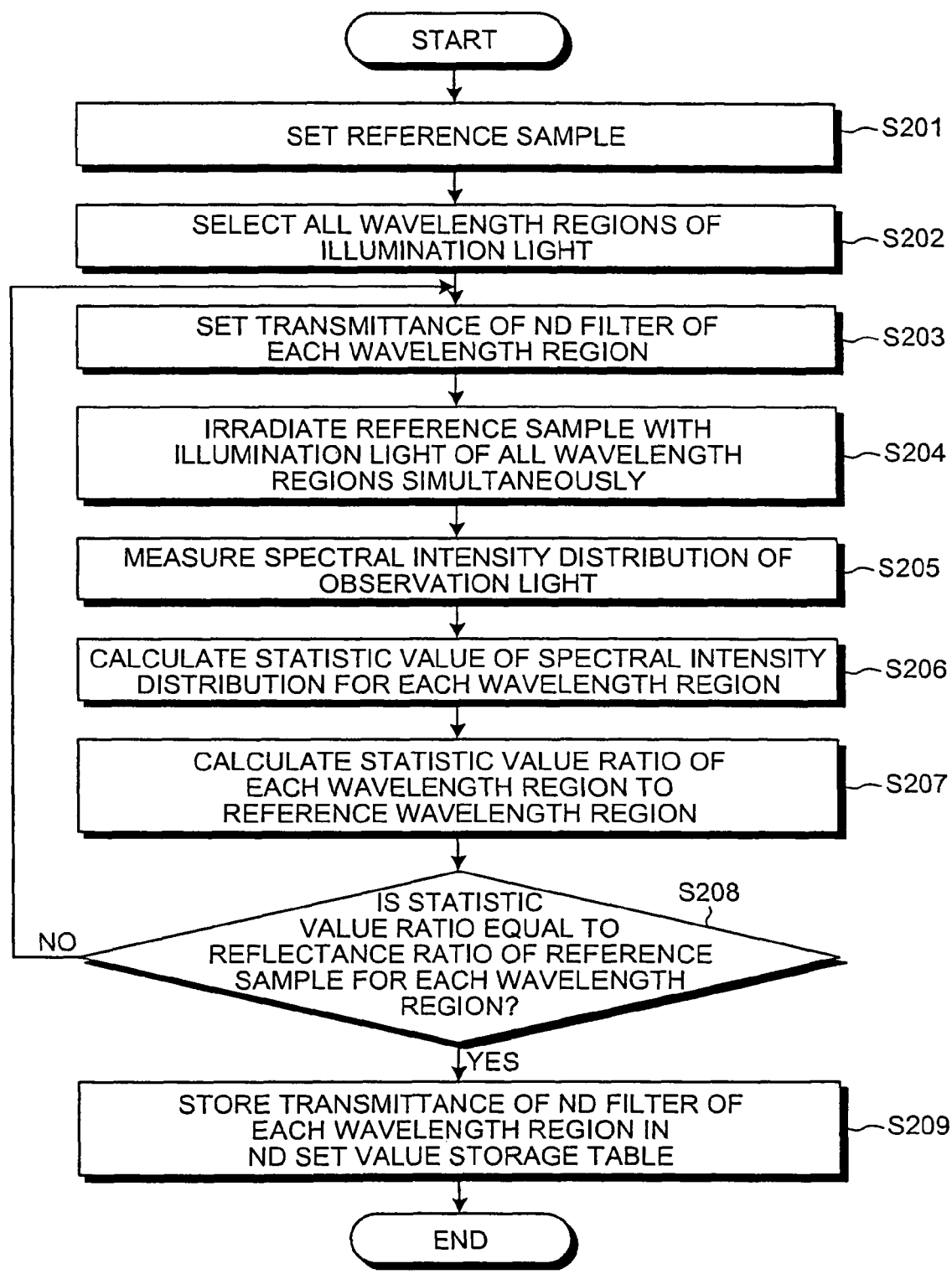

MICROSCOPE APPARATUS

CROSS-REFERENCE TO RELATED APPLICATIONS

This application is based upon and claims the benefit of priority from Japanese Patent Application No. 2006-301974, filed Nov. 7, 2006, the entire contents of which are incorporated herein by reference.

BACKGROUND OF THE INVENTION

1. Field of the Invention

The present invention relates to a microscope apparatus which is employed for observation and/or examination of a specimen with the use of illumination light of plural different wavelength regions.

2. Description of the Related Art

Conventionally, optical microscopes are widely used in semiconductor manufacturing processes for defect inspection and structural observation of device patterns. In recent years, the device patterns have become increasingly miniaturized and complex at a rapid pace. Accordingly, there is a high demand for further improvement in resolution of the optical microscopes. To achieve this goal, ultraviolet microscopes have been developed as described in Japanese Patent Applications Laid-Open No. 2006-154237, No. 2003-322801, and No. 2002-90640. These ultraviolet microscopes realize high resolution by using ultraviolet radiation as illumination light. The ultraviolet microscope uses ultraviolet radiation of a wide wavelength region ranging from a near-ultraviolet (NUV) region (i.e., radiation with the wavelength from 300 to 400 nm) to a deep-ultraviolet (DUV) region (i.e., radiation with the wavelength from 200 to 300 nm) as the illumination light.

Materials used in the semiconductor devices, such as Al and Cu, exhibit different reflectance and absorptance depending on the wavelength region of the ultraviolet radiation. The ultraviolet microscope realizes the defect inspection, structural observation, and the like utilizing this characteristic. For example, the wavelength region of the ultraviolet radiation used for the illumination is changed during the observation of a semiconductor device. Corresponding change in the reflectance of a device material is reflected in the change in pixel values of an observation image, and thus detected. Based on the detected change in reflectance, the device material is identified.

However, in the conventional ultraviolet microscopes, the change in reflectance of a specimen corresponding to the change in the wavelength region of ultraviolet radiation is not accurately reflected in the change in pixel values of the observation image, due to spectral output characteristic (i.e., distribution characteristic of emission spectrum) of a light source, spectral transmittance characteristic of an optical system of the microscope as a whole, spectral sensitivity characteristic of an imager that generates the observation image, and the like. For example, even when the changed wavelength region of ultraviolet radiation as the illumination actually causes the 1.5 times increase in reflectance of the specimen, the change in pixel values of the observation image sometimes does not show an accurate 1.5 times increase.

Further, when the wavelength region of the ultraviolet radiation used as the illumination is widened, another problem may arise in addition to the inaccurate correspondence between the change in reflectance of the specimen and the change in pixel values of the observation image. Namely, increased energy of ultraviolet radiation irradiated onto the specimen can damage the specimen significantly. Specifically, when a semiconductor device on which a resist is applied is used as a specimen, excessive ultraviolet radiation may break the resist. In addition, when the ultraviolet radiation of a wider wavelength region is employed, the imager receives increased amount of observation light, which may cause saturation of the observation image, in other words, which may cause brightness saturation of the imager.

SUMMARY OF THE INVENTION

An object of the present invention is to at least solve the problems as described above.

A microscope apparatus according to one aspect of the present invention includes a light source device including a light intensity adjuster which changes light intensity of illumination light of plural different wavelength regions selectively extracted from light emitted from a light source, the light source device emitting the illumination light including light of the plural different wavelength regions in such a manner that a light intensity ratio of light of one wavelength region to light of another wavelength region is variable, a storage table storing therein set values of the light intensity adjuster for each of combination patterns of the wavelength regions of the illumination light emitted from the light source device, and a setting controller controlling the light source device to change a setting of the light intensity adjuster based on the set value stored in the storage table according to wavelength designation information which designates a combination pattern of the wavelength regions.

A microscope apparatus according to another aspect of the present invention includes a light source device selectively emitting an illumination light of plural different wavelength regions, an illumination unit irradiating a specimen with the illumination light, an image forming unit forming an optical image of the specimen irradiated with the illumination light, an imager picking up the optical image to generate an observation image, an imaging parameter storage table storing therein at least one of a time of exposure and a gain of the imager determined based on spectral sensitivity information of the imager for each of the different wavelength regions, an imaging controller controlling the imager to change at least one of the time of exposure and the gain based on at least one of the time of exposure and the gain stored in the imaging parameter storage table according to wavelength designation information which designates a wavelength region of the illumination light emitted from the light source device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an example of an ND set value storage table shown in FIG. 1;

FIG. 5 is a diagram of an example of a GUI screen used in a process for acquiring set values to be stored in the ND set value storage table;

FIG. 6 is a diagram of another example of the ND set value storage table;

FIG. 7 is a diagram of still another example of the ND set value storage table;

FIG. 9 is a graph of spectral sensitivity characteristic of a camera shown in FIG. 8;

FIG. 10 is a diagram of an example of an imaging parameter storage table shown in FIG. 8;

FIG. 11 is a flowchart of a process procedure for acquiring set values to be stored in the ND set value storage table shown in FIG. 8.

DETAILED DESCRIPTION OF THE PREFERRED EMBODIMENTS

Figure 1:
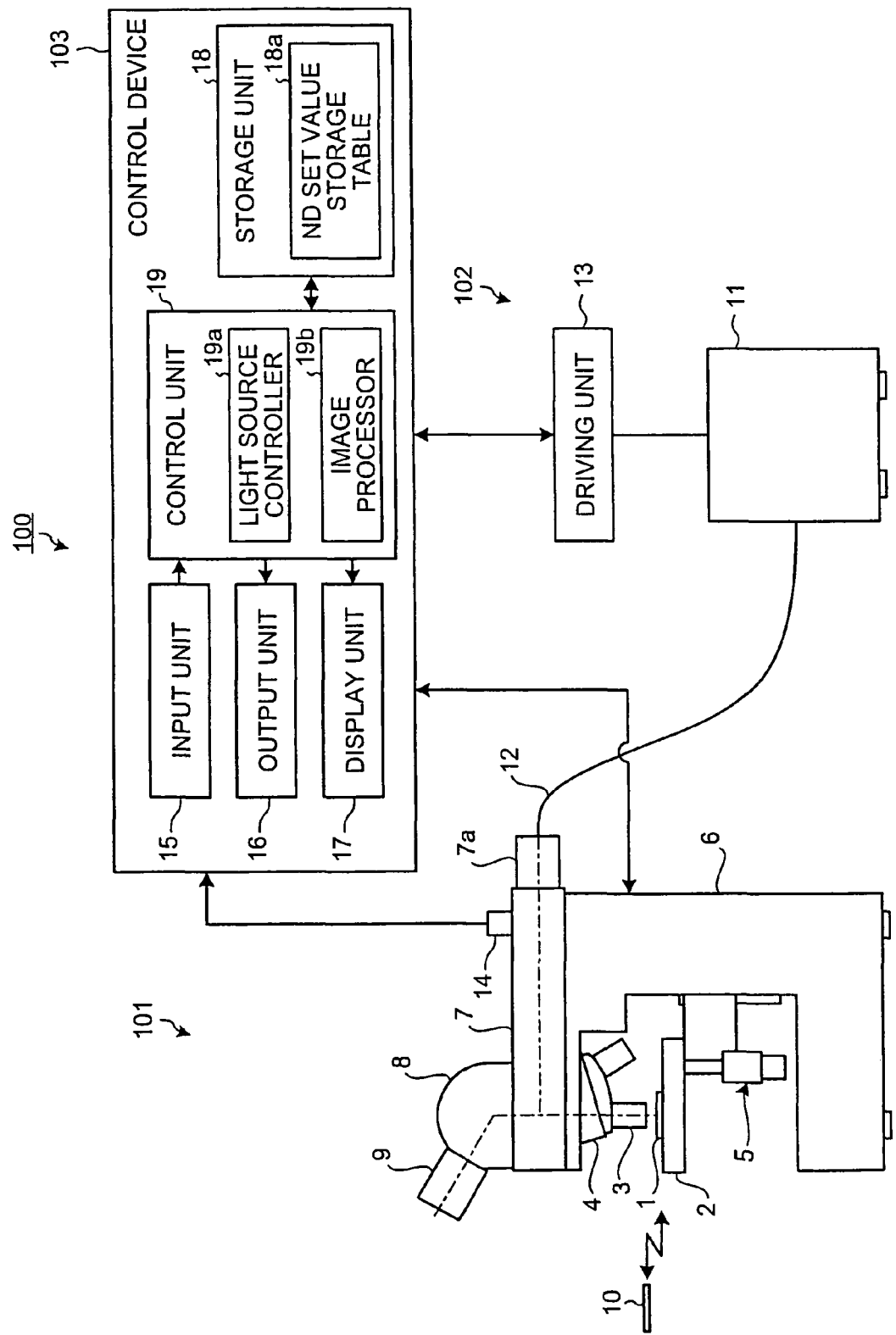
FIG. 1 is a diagram of an overall structure of a microscope apparatus according to a first embodiment of the present invention.

Exemplary embodiments of a microscope apparatus according to the present invention will be described in detail below with reference to the accompanying drawings. It should be noted that the present invention is not limited to the embodiments. The same reference characters are used to denote the same elements in the drawings.

A microscope apparatus according to a first embodiment of the present invention will be described. FIG. 1 is a diagram of an overall structure of an ultraviolet microscope apparatus 100 which is the microscope apparatus according to the first embodiment. As shown in FIG. 1, the ultraviolet microscope apparatus 100 mainly includes a microscope body 101, a light source device 102, and a control device 103.

The microscope body 101 includes a stage 2 on which a specimen 1 is placed, an objective lens 3 which is arranged over the specimen 1, a mount 6 which holds the objective lens 3 via a revolver 4 and supports the stage 2 via a focusing mechanism 5, a projection tube 7 which is arranged over the mount 6, an eyepiece unit 9 which is mounted on the projection tube 7 via a lens barrel 8, and a reference sample 10 which is placed on the stage 2 in such a manner that the reference sample 10 can be replaced with the specimen 1, and vice versa. The reference sample 10 is placed on the stage 2 by a user as appropriate, or arranged so that the reference sample 10 can be transported to and from the stage 2 by a transport mechanism or the like not shown.

The light source device 102 is provided with an internal light source. Further, the light source device 102 includes a wavelength-selection unit 11 that extracts ultraviolet light of plural different wavelength regions from light emitted from the light source to emit the extracted ultraviolet light in such a manner that the light intensity ratio is variable, an optical fiber 12 that receives ultraviolet light emitted from the wavelength-selection unit 11 to introduce the received light to the microscope body 101, and a driving unit 13 that is electrically connected to the wavelength-selection unit 11 to control the setting and the driving of the wavelength-selection unit 11.

The objective lens 3 is detachably attached to the revolver 4. The objective lens 3 is arranged over the stage 2 according to rotating movements of the revolver 4. The stage 2 is freely moved within a plane perpendicular to the light axis of the objective lens 3 by a planar driving mechanism not shown, and thereby changes an observed position of the specimen 1 or the reference sample 10 relative to the objective lens 3. Further, the stage 2 is vertically moved by the focusing mechanism 5, and thereby allowing the objective lens 3 to be focused on the specimen 1 or the reference sample 10.

The projection tube 7 is provided with an illumination optical system and an observation optical system both not shown inside, and a camera 14 is arranged on the projection tube 7 as an imager. The optical fiber 12 is attached to the projection tube 7 via a fiber connector 7a. The projection tube 7 takes in the ultraviolet light from the wavelength-selection unit 11 via the optical fiber 12, guides the ultraviolet light through the illumination optical system to the objective lens 3, and irradiates the specimen 1 or the reference sample 10 with the ultraviolet light as the illumination light. Further, the projection tube 7 forms an optical image of the specimen 1 or the reference sample 10 which is illuminated by the illumination optical system using the observation optical system and the objective lens 3. The camera 14 picks up the optical image to generate an observation image, and outputs observation image data to the control device 103.

The lens barrel 8 has an imaging lens (not shown) inside. The lens barrel 8 forms a visible optical image of the specimen 1 in cooperation with the objective lens 3 using visible light emitted from a lighting device (not shown) arranged below the stage 2. The visible optical image is visually observed via the eyepiece unit 9.

The control device 103 includes an input unit 15, an output unit 16, a display unit 17, and a storage unit 18, respectively performing input, output, display, and storage of various types of information, such as image data, and additionally includes a control unit 19 which controls processing and operations of the ultraviolet microscope apparatus 100. The control device 103 is configured with a personal computer, for example.

The input unit 15 is configured with, for example, a keyboard, a mouse, and a communication device, so as to receive inputs of various setting parameters and the like via a GUI (Graphical User Interface) presented on the display unit 17. The output unit 16 is configured with, for example, a communication device and a portable recording medium so as to externally supply processing data, various types of observation data such as observation image data, and the like as an output. The display unit 17 is configured with, for example, a liquid crystal display so as to display an observation image, setting information, notification information, and the like.

The storage unit 18 is configured with, for example, a hard disk, a read only memory (ROM), and a random access memory (RAM) so as to store control program for controlling the ultraviolet microscope apparatus 100. The storage unit 18 can additionally store various types of observation data such as observation image data and setting parameters of respective units, for example. In particular, the storage unit 18 stores an ND set value storage table 18a in which set values of ND filters described later is stored for each combination pattern of wavelength regions of ultraviolet radiation extracted and emitted by the wavelength-selection unit 11.

The control unit 19 is configured with, for example, a CPU so as to execute the control program stored in the storage unit 18 and to control the processing and the operation of each unit in the ultraviolet microscope apparatus 100. In particular, the control unit 19 is provided with a light source controller 19a which controls the light source device 102, and an image processor 19b which processes the observation image. The light source controller 19a which serves as a setting controller controls the driving unit 13 so that the setting of ND filters in the wavelength-selection unit 11 is changed based on the set values stored in the ND set value storage table 18a according to wavelength designation information. The wavelength designation information designates a combination pattern of wavelength regions of ultraviolet light emitted by the wavelength-selection unit 11. The image processor 19*b* performs various types of processing on the observation image based on the observation image data. In particular, the image processor 19*b* calculates a statistic value of pixel values of the observation image. Details of the control unit 19 and the storage unit 18 will be described later.

Figure 2:
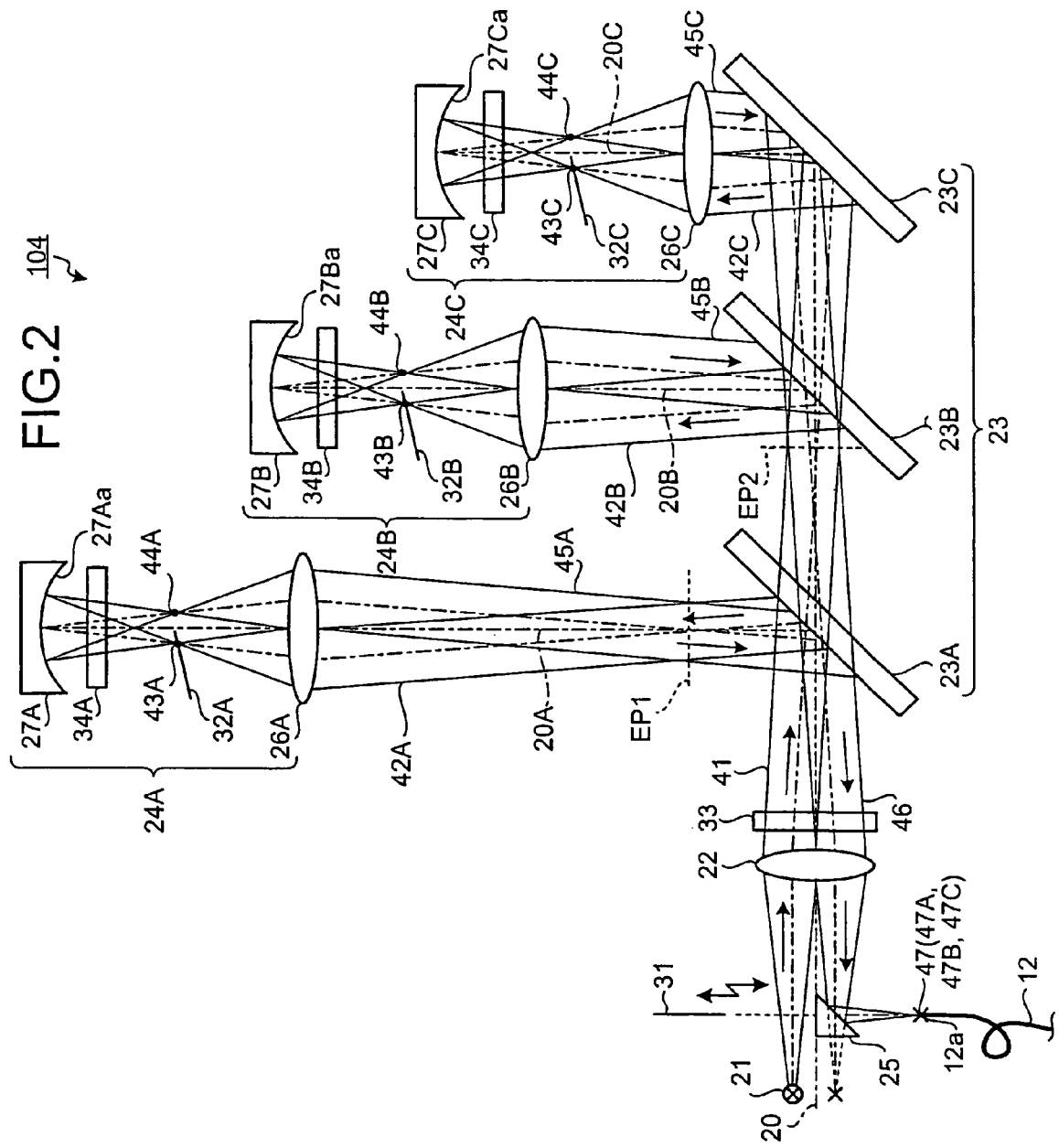
FIG. 2 is a diagram of a structure of a wavelength-selection optical system provided in a wavelength-selection unit shown in FIG. 1.

The wavelength-selection unit 11 will be described. FIG. 2 is a diagram of a main structure of a wavelength-selection optical system 104 provided inside the wavelength-selection unit 11. As shown in FIG. 2, the wavelength-selection optical system 104 includes a light source 21, a collector lens 22 which serves as a light-collecting optical system, a selective reflection optical system 23, a returning optical systems 24A to 24C, a total reflecting mirror 25, a shutter 31, shutters 32A to 32C, an ND filter 33 which serves as a batch light intensity adjuster, and ND filters 34A to 34C each of which serves as a wavelength-specific light intensity adjuster.

The light source 21 is a lamp such as a mercury lamp, a mercury xenon arc lamp, and a metal halide lamp, which emits light including ultraviolet light ranging from a near-ultraviolet region to a deep-ultraviolet region. A light emitting unit of the light source 21 is arranged on the front focal plane of the collector lens 22 off a light axis 20 of the collector lens 22 (in FIG. 2, the light emitting unit is shown above the light axis 20).

The collector lens 22 collects the light emitted from the light source 21 and emits a parallel flux 41 which is inclined with respect to the light axis 20. The parallel flux 41 enters the selective reflection optical system 23 via the ND filter 33. The parallel flux 41 is not strictly limited to an exact parallel light flux, and may include substantially parallel light flux. Similarly, the arranged position of the light emitting unit of the light source 21 is not strictly limited to the front focal plane of the collector lens 22. The light emitting unit can be arranged anywhere near the front focal plane.

The selective reflection optical system 23 is configured with dichroic mirrors 23A to 23C arranged in series on the light axis 20. Each of the dichroic mirrors 23A to 23C reflects ultraviolet light of a different predetermined wavelength region in the parallel flux 41 and transmits light of wavelength regions other than the predetermined wavelength region. For example, the dichroic mirror 23A reflects ultraviolet light of a wavelength region of 240 nm to 290 nm (referred to as first wavelength region, hereinbelow) and transmits the light of wavelength regions outside the range of 240 nm to 290 nm. Similarly, the dichroic mirrors 23B and 23C reflect the ultraviolet light of a wavelength region of 290 nm to 330 nm (referred to as second wavelength region, hereinbelow) and the ultraviolet light of a wavelength region of 330 nm to 385 nm (referred to as third wavelength region, hereinbelow), respectively, and each transmits the light outside the above-specified region.

The returning optical systems 24A to 24C are arranged on reflected light axes 20A to 20C of the dichroic mirrors 23A to 23C, respectively, so as to receive reflected fluxes 42A to 42C of the first to third wavelength regions reflected respectively by the dichroic mirrors 23A to 23C and to return and emit the received reflected fluxes 42A to 42C symmetrically about the reflected light axes 20A to 20C, respectively. The reflected light axes 20A to 20C correspond to light axes obtained as a result of reflection of the light axis 20 by the dichroic mirrors 23A to 23C, respectively.

The returning optical system 24A is configured with an imaging lens 26A and a concave mirror 27A. The imaging lens 26A is an aberration-corrected lens for the ultraviolet light of the first wavelength region, and has a predetermined focal length. The imaging lens 26A is arranged at a position on the reflected light axis 20A away from an exit pupil EP1 of the collector lens 22 by a distance equal to or longer than a predetermined focal distance. The imaging lens 26A collects the reflected flux 42A onto a back focal plane to form a first intermediate image 43A of the light source 21.

The concave mirror 27A has a spherical reflecting surface 27Aa having a predetermined curvature radius. The concave mirror 27A is arranged on the reflected light axis 20A away from the first intermediate image 43A along the reflected light axis 20A by a distance equal to the predetermined curvature radius of itself. The arranged position of the concave mirror 27A corresponds to a conjugate position of the exit pupil EP1 with respect to the imaging lens 26A. The concave mirror 27A collects a light flux emitted from the first intermediate image 43A via the ND filter 34A, and forms a second intermediate image 44A of the light source 21 at a symmetrical position of the first intermediate image 43A about the reflected light axis 20A. The light emitted from the second intermediate image 44A passes through the imaging lens 26A again, and becomes a turned flux 45A which is a parallel flux symmetrical with the reflected flux 42A about the reflected light axis 20A.

For example, when the focal length of the imaging lens 26A is 50 mm, the imaging lens 26A is arranged on the reflected light axis 20A away from the exit pupil EP1 at least by 50 mm. If the distance between the imaging lens 26A and the exit pupil EP1 is 100 mm, the conjugate position of the exit pupil EP1 with respect to the imaging lens 26A is a position 100 mm away from the imaging lens 26A. The concave mirror 27A is arranged at this conjugate position. Then, the first intermediate image 43A is formed at a position 50 mm away from the imaging lens 26A. Therefore, the curvature radius of the concave mirror 27A is set to 50 mm (=100−50) which is equal to the distance from the first intermediate image 43A. The second intermediate image 44A is formed at a symmetrical position of the first intermediate image 43A about the reflected light axis 20A 50 mm away from the imaging lens 26A.

The returning optical systems 24B and 24C are configured with, similarly to the returning optical system 24A, imaging lenses 26B and 26C and concave mirrors 27B and 27C, respectively. The imaging lenses 26B and 26C are aberration-corrected lenses respectively for ultraviolet light of the second wavelength region and the third wavelength region, and each has a predetermined focal distance. The imaging lenses 26B and 26C are arranged away from an exit pupil EP2 of the collector lens 22 by a distance equal to or longer than each predetermined focal distance along the light axis 20 and the reflected light axes 20B and 20C, respectively. The imaging lenses 26B and 26C collect the reflected fluxes 42B and 42C, respectively, so as to form first intermediate images 43B and 43C, respectively, of the light source 21 on the respective back focal planes.

The concave mirrors 27B and 27C have spherical reflecting surfaces 27Ba, 27Ca having predetermined curvature radiuses, respectively. The concave mirrors 27B and 27C are arranged on the reflected light axes 20B and 20C away from the first intermediate images 43B and 43C, respectively, by a distance equal to the predetermined curvature radius of each along the reflected light axes 20B and 20C, respectively. The arranged positions of the concave mirrors 27B and 27C correspond to conjugate positions of the exit pupil EP2 with respect to the imaging lenses 26B and 26C, respectively. The concave mirrors 27B and 27C collect the light flux emitted from the first intermediate images 43B and 43C via the ND filters 34B and 34C, respectively, and form second intermediate images 44B and 44C of the light source 21 at symmetrical positions of the first intermediate images 43B and 43C about the reflected light axes 20B and 20C, respectively. The light fluxes emitted from the second intermediate images 44B and 44C pass through the imaging lenses 26B and 26C again, respectively, and become turned fluxes 45B and 45C which are parallel fluxes symmetrical with the reflected fluxes 42B and 42C about the reflected light axes 20B and 20C.

The turned fluxes 45A to 45C emitted from the returning optical systems 24A to 24C are reflected again by the dichroic mirrors 23A to 23C, respectively. The fluxes reflected again are combined coaxially by the dichroic mirror 23A and become a combined light 46. The combined light 46 passes through the ND filter 33 and comes into the collector lens 22 symmetrically with the parallel flux 41 about the light axis 20 in a reverse direction from the parallel flux 41.

The collector lens 22 is an aberration-corrected lens for the ultraviolet light of the first to the third wavelength regions, and converges the ultraviolet light of the first to the third wavelength regions included in the combined light 46 onto an identical position via the total reflecting mirror 25. Thus, light source images 47A to 47C of the light source 21 corresponding to the ultraviolet light of the first to the third wavelength regions are formed telecentrically at the identical position. The light source images 47A to 47C serve as secondary light sources of the ultraviolet light of the first to the third wavelength regions, respectively. The light source image 47 which is an integration of the light source images 47A to 47C is a secondary light source of the combined ultraviolet light of the first to the third wavelength regions.

The optical fiber 12 is arranged so that an incident-end surface 12a thereof comes to a focusing position of the light source image 47. The optical fiber 12 receives ultraviolet light emitted by the light source image 47 at the incident-end surface 12a, and emits the received light from an emission-end surface attached to the projection tube 7. Thus, the light source device 102 provides a combination of ultraviolet light of the first to the third wavelength regions to the projection tube 7 as illumination light.

On the other hand, the shutters 32A to 32C are arranged near the first intermediate images 43A to 43C, respectively, and are opened/closed by opening/closing driving mechanisms not shown, thereby selectively blocking and opening the light paths of the light converged by the imaging lenses 26A to 26C, respectively. Each opening/closing driving mechanism is electrically connected to the driving unit 13, and opens/closes corresponding one of the shutters 32A to 32C based on a command supplied by the driving unit 13. The light paths blocked by the shutters 32A to 32C are not limited to the light paths of the light converged by the imaging lenses 26A to 26C, and may be light paths of light coming from the concave mirrors 27A to 27C, or both of these.

For example, each of the ND filters 34A to 34C is formed with a disk-like member with small holes. The concentration of the holes varies in a circumferential direction. Therefore, when a rotational driving mechanism (not shown) rotationally drives the disk-like member, the intensities of the passing parallel fluxes that are emitted from the first intermediate images 43A to 43C, reflected by the concave mirrors 27A to 27C, and form the second intermediate images 44A to 44C can be changed. Each of the rotational driving mechanisms is electrically connected to the driving unit 13, and rotates the corresponding one of the ND filters 34A to 34C (i.e., disk-like members) based on a command supplied by the driving unit 13. The ND filters 34A to 34C are not limited to elements which change the light intensity of light coming from the first intermediate images 43A to 43C, passing therethrough, and forming the second intermediate images 44A to 44C. The ND filters 34A to 34C can be any elements which change the light intensity of light passing between the dichroic mirrors 23A to 23C and the concave mirrors 27A to 27C.

The ND filter 33 is configured similarly to the ND filters 34A to 34C. The ND filter 33 rotates according to a command supplied from the driving unit 13 to change the light intensity of each of the parallel flux 41 and the combined light 46. The ND filter 33 may be an element which changes the light intensity of one of the parallel flux 41 and the combined light 46. Alternatively, the ND filter 33 may be an element which changes the light intensity of at least one of the light coming from the light source 21 to the collector lens 22 and the light coming out from the collector lens 22 and reaching the optical fiber 12 via the total reflection mirror 25.

The shutter 31 is placed on the light path extending from the light source 21 to the collector lens 22 by a slide-driving mechanism not shown in such a manner that the shutter 31 can be freely retracted from the light path. The slide-driving mechanism is electrically connected to the driving unit 13, and inserts/retracts the shutter 31 into/from the light path according to a command from the driving unit 13. When placed on the light path, the shutter 31 blocks the light coming out from the light source 21 toward the wavelength-selection optical system 104 and also blocks the emission of ultraviolet light from the light source device 102 via the optical fiber 12. The shutter 31 may be an element which blocks at least one of the parallel flux 41, the combined light 46, and the ultraviolet light from the collector lens 22 to the optical fiber 12.

The wavelength-selection unit 11 configured as described above selectively extracts the ultraviolet light of the first to the third wavelength regions by opening and closing an appropriate combination of the shutters 32A to 32C. Further, the wavelength-selection unit 11 combines and emits the extracted light in such a manner that the intensity ratio and the total light intensity can be changed by rotating an appropriate combination of the ND filters 33 and 34A to 34C.

Setting control of the ND filters 33, 34A to 34C will be described for each combination pattern of the wavelength regions of ultraviolet light emitted from the light source device 102.

In the ultraviolet microscope apparatus 100, predetermined set values of the ND filters 33, 34A to 34C are stored in the ND set value storage table 18a for each combination pattern of the wavelength regions determined according to the selection of the shutters 32A to 32C. These values are set and stored so as to correct the influence of spectral characteristics of the microscope body 101 and the light source device 102, and to provide the light composed of lights of different wavelength regions with such an intensity ratio that the observation image of the specimen 1 can be generated with equal sensitivity for each of the first to the third wavelength regions. The spectral characteristic of the microscope body 101 includes the spectral sensitivity characteristic of the camera 14 and the spectral transmission characteristic of the optical system as a whole that contributes to the observation in the microscope body 101. Further, the spectral characteristic of the light source device 102 includes spectral output characteristic of the light source 21, the spectral transmission characteristic of the wavelength-selection optical system 104 as a whole, and the spectral transmission characteristic of the optical fiber 12.

On receiving the wavelength designation information as an input from the input unit 15, for example, the light source controller 19a makes the driving unit 13 open/close the shutters 32A to 32C according to the combination pattern of wavelength regions designated by the wavelength designation information. At the same time, the light source controller 19a makes the driving unit 13 change the setting of at least one of the ND filters 33, 34A to 34C based on the set values stored in the ND set value storage table 18a according to the designated combination pattern of the wavelength regions.

Thus, the ultraviolet microscope apparatus 100 can set the ND filters 33, 34A to 34C in the state as stored in the ND set value storage table 18a according to the designated combination pattern of wavelength regions every time the combination pattern of wavelength regions is designated so as to generate the observation image of the specimen 1 with the equal sensitivity for each of the first to the third wavelength regions. As a result, the ultraviolet microscope apparatus 100 can always generate the observation image in the brightness corresponding to the spectral reflectance of the specimen 1 even when the wavelength region of the ultraviolet light emitted from the light source device 102 is changed according to the wavelength designation information, whereby the change in the pixel values of the observation image can be made to accurately correspond with the change in the reflectance of the specimen 1.

Each of the set values stored in the ND set value storage table 18a is previously set so that the total light intensity of the ultraviolet light emitted from the light source device 102 as the illumination light is equal for each of the combination patterns of the wavelength regions. Therefore, the ultraviolet microscope apparatus 100 can maintain the total light intensity of the ultraviolet light emitted from the light source device 102 at a constant level. Even when the number of wavelength regions combined is increased according to the wavelength designation information, in other words, even when ultraviolet light of a wider wavelength region is employed, the energy of the ultraviolet light irradiating the specimen 1 does not increase, whereby the damage on the specimen 1 can be prevented and the saturation of the observation image can be prevented.

FIG. 3 is a diagram of an example of the ND set value storage table 18a. In FIG. 3, symbol "O" represents a wavelength region of light extracted by the wavelength-selection unit 11, in other words, the wavelength region of the light transmitted through the shutters 32A to 32C, whereas symbol "X" represents a wavelength region of light blocked by the shutters 32A to 32C. Further, "BATCH ND FILTER" corresponds to the ND filter 33, whereas "FIRST ND FILTER", "SECOND ND FILTER", and "THIRD ND FILTER" correspond respectively to the ND filters 34A to 34C. The set value of each of the ND filters is represented by the transmittance in %. Further, symbol "–" means that the pertinent value can be a predetermined default value, or an optional transmittance value.

The light source controller 19a refers to the ND set value storage table 18a according to the wavelength designation information. Then, the light source controller 19a makes the driving unit 13 change the setting of the ND filters 34A to 34C based on the set values of "FIRST FILTER", "SECOND FILTER", and "THIRD FILTER" stored in association with the combination pattern of the wavelength regions designated by the wavelength designation information, so as to set the intensity ratio of one wavelength region to another. Similarly, the light source controller 19a makes the driving unit 13 change the setting of the ND filter 33 based on the set value of "BATCH ND FILTER", so as to set the total light intensity of the ultraviolet light emitted from the light source device 102. Specifically, on receiving a command to combine the first and the second wavelength regions according to the wavelength designation information, for example, the light source controller 19a sets the transmittance of the ND filters 34A and 34B to 100% and 60%, respectively, while maintaining the current transmittance of the ND filter 34C, and at the same time, sets the transmittance of the ND filter 33 to 50%.

Figure 4:
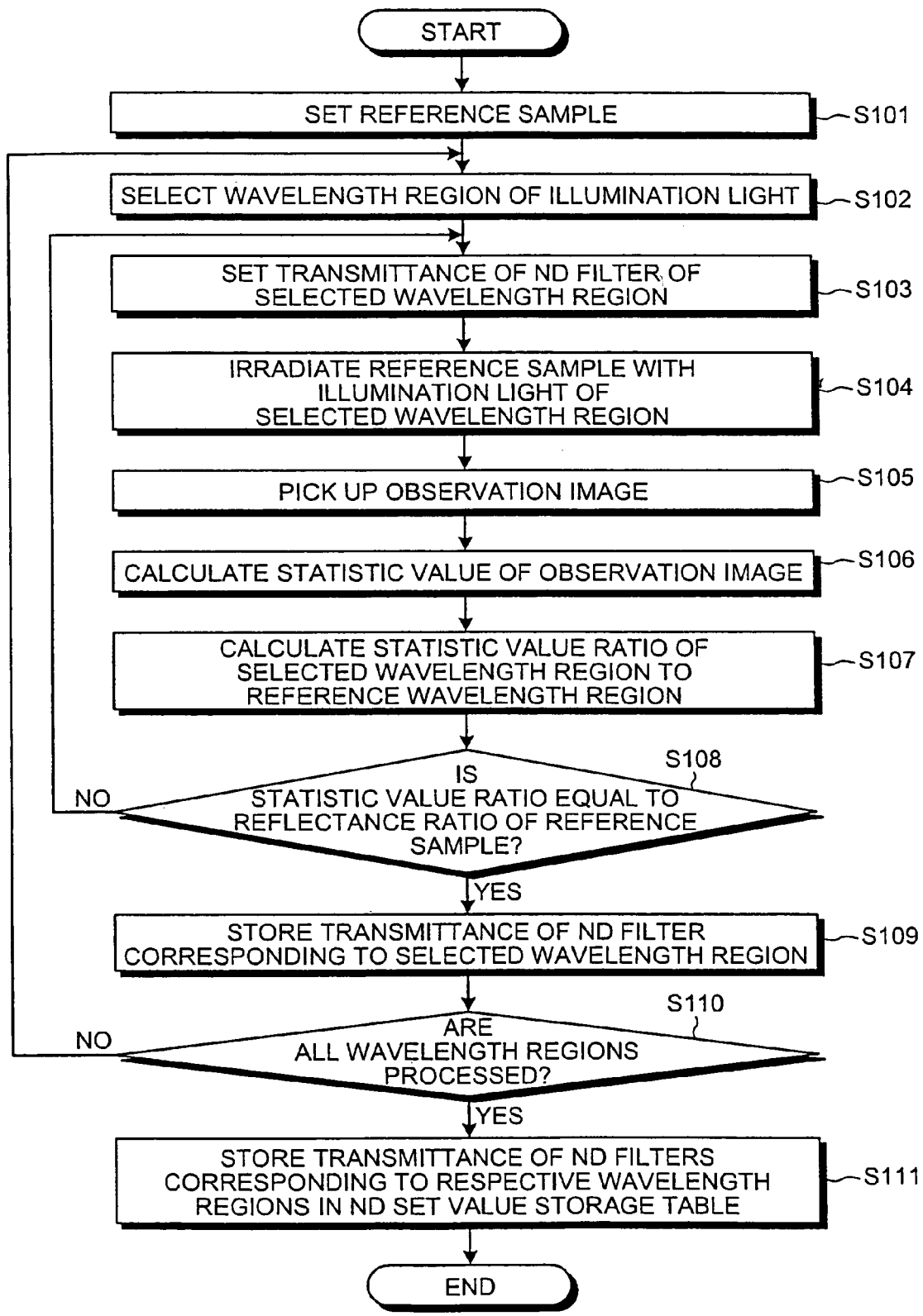
FIG. 4 is a flowchart of a process procedure for acquiring set values to be stored in the ND set value storage table.

A manner of acquiring each set value to be previously stored in the ND set value storage table 18a will be described. FIG. 4 is a flowchart of a process procedure of an acquiring process. Further, FIG. 5 is a diagram of an example of a GUI screen 50 utilized in the acquiring process. The GUI screen 50 is presented on a monitor provided in the display unit 17. Through the GUI screen 50, various parameters are input and results are displayed, for example.

Firstly, the reference sample 10 is placed on the stage 2 in place of the specimen 1 as shown in FIG. 4 (step S101). In this state, the ultraviolet microscope apparatus 100 is set up so that the reference sample 10 can be observed through the camera 14. The reference sample 10 has a predetermined reflectance ratio for two different wavelength regions which are selected from the first to the third wavelength regions. The reflectance ratio of the reference sample 10 is previously known. For example, a glass plate whose surface is optically polished is employed as the reference sample 10.

Next, one of the first to the third wavelength regions is selected as the wavelength region of the illumination light (step S102). User can select the wavelength region by entering an identification name of a desired wavelength region in a wavelength region input field 51 displayed on the GUI screen 50. The wavelength region selected first in step S102 is treated as a reference wavelength region in the process procedure of the acquiring process.

Then, the transmittance of the ND filter among the ND filters 34A to 34C corresponding to the wavelength selected in step S102 is set (step S103). User can set the transmittance by appropriately setting one of ND filter setting controls 52 displayed on the GUI screen 50 corresponding to the selected wavelength region. The light source controller 19a makes the driving unit 13 set the target ND filter according to the set value (scale) of the ND filter setting control 52, and temporarily stores the transmittance represented by the set value in the storage unit 18.

Then, the reference sample 10 is irradiated with the ultraviolet light of the wavelength region selected in step S102 as the illumination light (step S104). The light source controller 19a makes the driving unit 13 open the shutter corresponding to the irradiated wavelength region among the shutters 32A to 32C and closes the rest of the shutters according to irradiation instruction information which instructs to start the irradiation.

Then, the camera 14 picks up the image of the reference sample 10 (step S105). The control unit 19 makes the camera 14 pick up the optical image to generate the observation image, and output the observation image data to the control device 103. The control unit 19 stores the observation image data obtained from the camera 14 in the storage unit 18 and displays the same in an image display field 53 of the GUI screen 50 according to the wavelength region.

Thereafter, the image processor 19b calculates the statistic value of the observation image generated in step S105 (step S106). The image processor 19b calculates the statistic value of the pixel values of the observation image based on the observation image data stored in the storage unit 18. Specifically, the image processor 19b calculates the average value of the pixel values, for example. The statistic value calculated by the image processor 19b is not limited to the average value, and can be a median value, or a mode value. The control unit 19 displays the statistic value calculated by the image processor 19*b* for each of the wavelength regions in a statistic value display field 54 of the GUI screen 50.

The ratio of the statistic value of the wavelength region selected in step S102 to the statistic value of the reference wavelength region is calculated based on the statistic values calculated in step S106, in other words, based on the statistic values displayed in the statistic value display field 54 (step S107). When the wavelength region selected in step S102 is the reference wavelength region, in other words, if only one statistic value is displayed in the statistic value display field 54, the processed wavelength region is equal to the reference wavelength region, and the ratio of statistic values is "1".

Subsequently, it is determined whether the ratio of statistic values calculated in step S107 is equal to the ratio of reflectance of the reference sample 10 for the wavelength regions corresponding to the ratio of statistic values or not (step S108). When the ratio of statistic values is not equal to the ratio of reflectance (NO in step S108), the process flow returns to step S103 and subsequent process is repeated. On the other hand, if the ratio of statistic values is equal to the ratio of reflectance (YES in step S108), the transmittance of the ND filter set in step S103 (i.e., set value) is temporarily stored in the storage unit 18 as an established value corresponding to the wavelength region selected in step S102 (step S109).

Thereafter, it is determined whether all of the first to the third wavelength regions are processed or not (step S110). When not all of the wavelength regions are processed (NO in step S110), the process flow returns to step S102 and the subsequent process is repeated. On the other hand, when all the wavelength regions are processed (YES in step S110), the transmittance (i.e., set value) of the ND filter of each wavelength region temporarily stored in the storage unit 18 in step S109 is stored in the ND set value storage table 18*a* (step S111). The set value of each wavelength region is stored for each combination pattern of the first to the third wavelength regions as shown in FIG. 3, for example. User can store the set values in the ND set value storage table 18*a* by manipulating a button 55 (i.e., button labeled "STORE SET VALUE OF ND FILTER") displayed on the GUI screen 50, for example.

On the other hand, the set value (transmittance) of the ND filter 33 stored in the ND set value storage table 18*a* can be determined for each combination pattern of wavelength regions based on the number of combined wavelength regions, for example, as shown in FIG. 3. Specifically, for a combination pattern in which ultraviolet light of three different wavelength regions are emitted independently, the transmittance of the ND filter 33 ("BATCH ND FILTER") is set to 100%. For a combination pattern in which light of two different wavelength regions are combined and emitted, the transmittance of the ND filter 33 is set to 50% (i.e., 100/2%). Further, for a combination pattern in which light of three different wavelength regions are combined and emitted, the transmittance of the ND filter 33 is set to 33% (i.e., 100/3%).

As described above, in the ultraviolet microscope apparatus 100 according to the first embodiment, the set value (transmittance) of each of the ND filter 33 and the ND filter 34A to 34C is determined with the use of the reference sample 10, and stored in the ND set value storage table 18*a* for each combination pattern of the first to the third wavelength regions, and the light source controller 19*a* makes the driving unit 13 change the setting of the ND filter 33 and the ND filters 34A to 34C based on each set value stored in the ND set value storage table 18*a* according to the wavelength designation information which designates the combination pattern of the wavelength regions of the ultraviolet light emitted from the light source device 102. As a result, the ultraviolet microscope apparatus 100 can always generate the observation image in the brightness corresponding to the spectral reflectance of the specimen 1 even when the wavelength region of the ultraviolet light emitted from the light source device 102 is changed according to the wavelength designation information, whereby the change in pixel values of the observation image can be made to accurately correspond with the change in the reflectance of the specimen 1.

Further, in the ultraviolet microscope apparatus 100, each of the set values stored in the ND set value storage table 18*a* is previously determined so that the total light intensity of the ultraviolet light emitted from the light source device 102 as the illumination light is equal for each of the combination patterns of the wavelength regions, whereby the total light intensity of the ultraviolet light emitted from the light source device 102 can be maintained at a constant level. Thus, even when the number of combined wavelength regions is increased according to the wavelength designation information in the ultraviolet microscope apparatus 100, the energy of the ultraviolet light irradiating the specimen 1 does not increase, whereby the damage on the specimen 1 can be prevented and the saturation of the observation image can also be prevented.

In the ND set value storage table 18*a* illustrated in FIG. 3, the set value (transmittance) of each ND filter is determined so that the ratio of light intensity between the light of the first to the third wavelength regions is set by the ND filters 34A to 34C, and that the total light intensity of the ultraviolet light emitted from the light source device 102 is set by the ND filter 33. The set value stored in the ND set value storage table 18*a*, however, is not limited to the above, and can be set as shown in FIGS. 6 and 7, for example.

FIG. 6 is a diagram of another example of the ND set value storage table 18*a*, and is represented similarly to FIG. 3. In the example shown in FIG. 6, the light source controller 19*a* makes the driving unit 13 change the setting of the ND filters 34A to 34C based on the set values of "FIRST ND FILTER", "SECOND ND FILTER", and "THIRD ND FILTERS" while maintaining the transmittance of the ND filter 33 to 100%, thereby setting the ratio of light intensity between the light of the first to the third wavelength regions, and at the same time, setting the total light intensity of the ultraviolet light emitted from the light source device 102. When the transmittance of the ND filter 33 is fixed to 100%, the ND filter 33 may be removed from the wavelength-selection optical system 104.

FIG. 7 is a diagram of still another example of the ND set value storage table 18*a*, and is represented similarly to FIGS. 3 and 6. In the example shown in FIG. 7, the light source controller 19*a* makes the driving unit 13 change the setting of the ND filter 33 based on the set value of "BATCH ND FILTER" while maintaining the transmittance of the ND filters 34A to 34C to 100%, thereby setting the ratio of light intensity between the light of the first to the third wavelength regions, and at the same time, setting the total light intensity of the ultraviolet light emitted from the light source device 102. When the transmittance of the ND filters 34A to 34C is fixed to 100%, the ND filters 34A to 34C may be removed from the wavelength-selection optical system 104.

Figure 8:
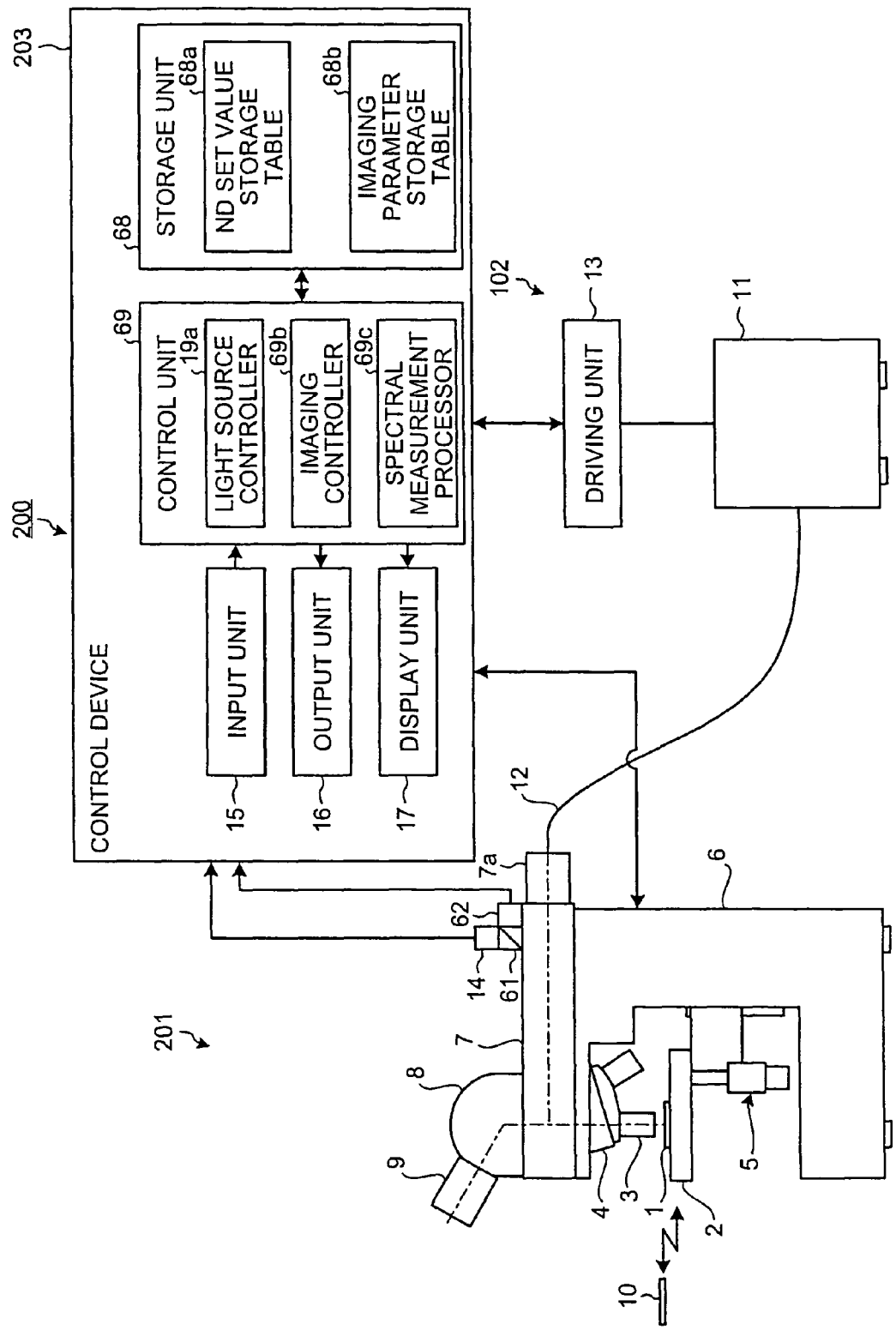
FIG. 8 is a diagram of an overall structure of a microscope apparatus according to a second embodiment of the present invention.

A second embodiment of the present invention will be described. FIG. 8 is a diagram of an overall configuration of an ultraviolet microscope apparatus 200 which is the microscope apparatus according to the second embodiment. As shown in FIG. 8, the ultraviolet microscope apparatus 200 is based on the structure of the ultraviolet microscope apparatus 100, and includes a microscope body 201 and a control device 203 in place of the microscope body 101 and the control device 103. The microscope body 201 is based on the structure of the microscope body 101, and additionally includes a beam splitter 61 and a spectrometer 62. The control device 203 is based on the structure of the control device 103, and includes a storage unit 68 and a control unit 69 in place of the storage unit 18 and the control unit 19. The storage unit 68 includes an ND set value storage table 68a and an imaging parameter storage table 68b. The control unit 69 includes the light source controller 19a, an imaging controller 69b, and a spectral measurement processor 69c. In other respects, the configuration of the ultraviolet microscope apparatus according to the second embodiment is the same as that of the first embodiment, and the same element is denoted by the same reference character.

The beam splitter 61 is arranged between the observation optical system (not shown) provided in the projection tube 7 and the camera 14. The beam splitter 61 splits the observation light that forms the optical image of the reference sample 10 in two in a predetermined ratio. The spectrometer 62 receives one of two fractions of the observation light to measure the spectral intensity distribution of the received observation light, and outputs spectral intensity distribution data to the control device 203. The camera 14 receives another of the two fractions of the observation light provided by the beam splitter 61, and picks up the optical image. Alternatively, the beam splitter 61 may be removed at a time of observation of the specimen 1 so that the camera 14 is arranged similarly to the first embodiment.

In the ND set value storage table 68a, set values of the ND filters 33, 34A to 34C previously determined with the use of the spectrometer 62 described later are stored for each of the combination patterns of the wavelength regions selected by the shutters 32A to 32C, similarly to the ND set value storage table 18a. Each of the set values stored in the ND set value storage table 68a is employed to correct the influence of the spectral characteristic of each of the microscope body 201 and the light source device 102, and to realize such an intensity ratio between the light of wavelength regions that allows for the formation of the optical image of the specimen 1. The spectral characteristic of the microscope body 201 includes the spectral transmission characteristic of the optical system as a whole that contributes to the observation in the microscope body 201. Further, the spectral characteristic of the light source device 102 includes spectral output characteristic of the light source 21, the spectral transmittance characteristic of the wavelength-selection optical system 104 as a whole, and a spectral transmittance characteristic of the optical fiber 12.

The light source controller 19a makes the driving unit 13 open/close the shutters 32A to 32C according to the combination pattern of the wavelength regions designated by the wavelength designation information, similarly to the first embodiment. At the same time, the light source controller 19a makes the driving unit 13 change the setting of at least one of the ND filter 33 and the ND filters 34A to 34C based on the set value stored in the ND set value storage table 68a in association with the combination pattern of the wavelength regions.

Thus, the ultraviolet microscope apparatus 200, similarly to the ultraviolet microscope apparatus 100, can form the optical image of the specimen 1 while correcting the influence of the spectral characteristics of the microscope body 201 and the light source device 102 every time the combination pattern of the wavelength regions is designated. Even when the wavelength region of the ultraviolet light emitted from the light source device 102 is changed according to the wavelength designation information, the ultraviolet microscope apparatus 200 can form the optical image in the brightness corresponding to the spectral reflectance of the specimen 1.

Each of the set values stored in the ND set value storage table 68a is previously determined so that the total light intensity of the ultraviolet light emitted from the light source device 102 as the illumination light is equal for each of the combination patterns of the wavelength regions. Therefore, the ultraviolet microscope apparatus 200, similarly to the ultraviolet microscope apparatus 100, can maintain the total light intensity of the ultraviolet light emitted from the light source device 102 at a constant level. Even when the number of combined wavelength regions is increased, the energy of the ultraviolet light irradiating the specimen 1 does not increase, whereby the damage on the specimen 1 can be prevented, and at the same time, the saturation of the observation image can be prevented.

On the other hand, in the imaging parameter storage table 68b, imaging parameters of the camera 14 as previously determined based on the spectral sensitivity characteristic of the camera 14 as shown in FIG. 9 are stored for each of the first to the third wavelength regions. The imaging parameters are employed to correct the influence of the spectral sensitivity characteristic of the camera 14 and to allow the generation of the observation image with equal imaging sensitivity for each of the first to the third wavelength regions. Specifically, as shown in FIG. 10, for example, a relative value of time of exposure, in other words, ratio of the time of exposure of each wavelength region is stored for each combination pattern, in which each of the ultraviolet light of the first to the third wavelength regions is emitted independently. In FIG. 10, the combination patterns of the wavelength regions are represented similarly to FIG. 3. The imaging parameter stored in the imaging parameter storage table 68b is not limited to the relative value of the time of exposure. Alternatively, the imaging parameter may be an absolute value of the time of exposure, or a gain relative to an image signal. Further, the spectral sensitivity characteristic shown in FIG. 9 is found in advance as a characteristic value specific to the camera 14.

The imaging controller 69b makes the camera 14 change the setting of the imaging parameters according to the combination patterns, in which the ultraviolet light of the first to the third wavelength regions are emitted independently, among the combination patterns of the wavelength regions designated by the wavelength designation information, and based on the imaging parameters stored in the imaging parameter storage table 68b in association with the combination patterns of the wavelength regions. Thereafter, the imaging controller 69b makes the camera 14 pick up the optical image according to the imaging instruction information which instructs the image pick-up.

Thus, in generating the observation image by emitting the ultraviolet light of each of the first to the third wavelength regions independently, the ultraviolet microscope apparatus 200 can correct the influence of the spectral sensitivity characteristic specific to the camera 14 and generate the observation image by picking up the optical image with the imaging sensitivity equal to each of the first to the third wavelength regions.

As described above, when the ultraviolet light of each of the first to the third wavelength regions are independently emitted from the light source device 102, the ultraviolet microscope apparatus 200 can form the optical image in the brightness corresponding to the spectral reflectance of the specimen 1 under the control of the light source controller 19a, and at the same time, the ultraviolet microscope apparatus 200 can generate the observation image by picking up the optical image with the equal imaging sensitivity for each of the first to the third wavelength regions under the control of the imaging controller 69b. As a result, the ultraviolet microscope apparatus 200 can always generate the observation image in the brightness corresponding to the spectral reflectance of the specimen 1 even when the wavelength region of the ultraviolet light emitted independently from the light source device 102 is changed, whereby the change in the pixel values of the observation image can be made to accurately correspond with the change in the reflectance of the specimen 1.

When the camera 14 has a flat spectral sensitivity characteristic, in other words, when the camera 14 has equal imaging sensitivity for all the wavelength regions, the ultraviolet microscope apparatus 200 can always generate the observation image in the brightness corresponding to the spectral reflectance of the specimen 1 for all the combination patterns of the wavelength regions selectable by the shutters 32A to 32C, and not only when the ultraviolet light of the first to the third wavelength regions are emitted from the light source device 102 independently, whereby the change in the pixel values of the observation image can be always made to accurately correspond with the change in the reflectance of the specimen 1.

A manner of acquiring each set value to be stored in the ND set value storage table 68a will be described. FIG. 11 is a flowchart of a process procedure for acquiring the set value. As described above, each set value to be stored in the ND set value storage table 18a is acquired with the use of the image data of the observation image. In the ND set value storage table 68a, each set value to be stored is acquired with the use of a result of measurement by the spectrometer 62.

Firstly, the reference sample 10 is placed on the stage 2 in place of the specimen 1 as shown in FIG. 11 (step S201). In this state, the ultraviolet microscope apparatus 200 is set up so that the reference sample 10 can be observed through the camera 14.

Next, the first to the third wavelength regions are all selected as the wavelength region of the illumination light (step S202). User can select the wavelength region, similarly to step S102, via the GUI screen (not shown) presented on a monitor provided in the display unit 17.

Then, the transmittance of the ND filter corresponding to each of the first to the third wavelength regions is set (step S203). User can set the transmittance, similarly to step S103, by setting the ND filter setting control displayed in the GUI screen (not shown) for each wavelength region to an appropriate level. The light source controller 19a makes the driving unit 13 set each of the ND filters 34A to 34C according to the set value (scale) of the ND filter setting control for each wavelength region, and temporarily stores the transmittance represented by the set value in the storage unit 68.

Then, the reference sample 10 is irradiated with ultraviolet light of the first to the third wavelength regions as the illumination light simultaneously (step S204). The light source controller 19a makes the driving unit 13 open all the shutters 32A to 32C according to the irradiation instruction information which instructs to start the irradiation.

Figure 12:
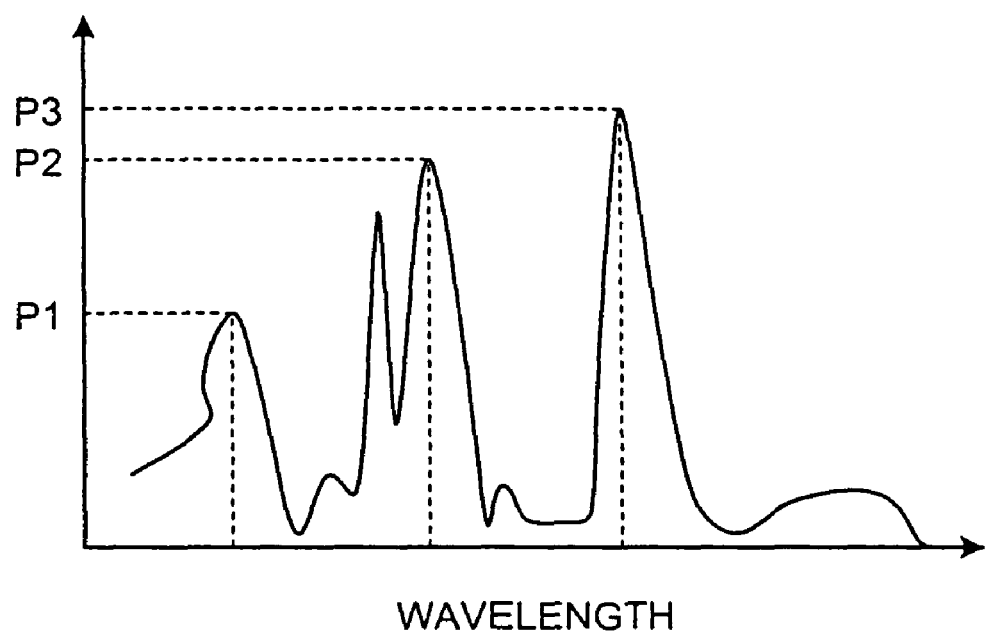
FIG. 12 is a graph of an example of spectral intensity distribution data obtained through measurements by a spectrometer shown in FIG. 8.

Then, the spectrometer 62 measures the spectral intensity distribution of the observation light (step S205), and the spectral measurement processor 69c calculates the statistic value of the spectral intensity distribution of each of the first to the third wavelength regions based on the spectral intensity distribution data, which is the measurement values (step S206). The spectrometer 62 acquires the spectral intensity distribution data as shown in FIG. 12, for example, and the spectral measurement processor 69c calculates, for example, maximum values "P1", "P2", and "P3" in the respective wavelength regions as the statistic values based on the spectral intensity distribution data. The statistic value calculated by the spectral measurement processor 69c is not limited to the maximum value, and may be an average value, a median value, or the like. The control unit 69 displays the statistic value calculated by the spectral measurement processor 69c on the GUI screen (not shown) for each wavelength region.

Then, the ratio of the statistic value of the reference wavelength region to the statistic value of each of the wavelength regions is calculated based on the statistic values calculated in step S206 (step S207). The reference wavelength region is a wavelength region which is selected from the first to the third wavelength regions in advance. When the first wavelength region is selected as the reference wavelength region, for example, the ratio of statistic value relative to the statistic value of the first wavelength region is calculated for each of the first to the third wavelength regions in step S207. The calculation of the ratio of the statistic value of the wavelength region which is the same as the reference region may be omitted.

Then, it is determined whether the ratio of statistic values calculated for each wavelength region in step S207 is equal to the ratio of reflectance of the reference sample 10 corresponding to the wavelength regions corresponding to the ratio of statistic values or not (step S208). When the ratio of statistic values is not equal to the ratio of reflectance for each of the wavelength regions (NO in step S208), the process flow returns to step S203 and subsequent process is repeated. On the other hand, when the ratio of statistic values is equal to the ratio of reflectance for each wavelength region (YES in step S208), the transmittance (set values) of the ND filters 34A to 34C set in step S203 for each wavelength region is stored in the ND set value storage table 68a (step S209). User can store the transmittance in the ND set value storage table 68a by manipulating a predetermined button displayed on the GUI screen (not shown), for example.

Thus, since the ultraviolet microscope apparatus 200 can acquire the set values of the ND filters 34A to 34C at one time with the use of the spectrometer 62, the set values to be stored in the ND set value storage table 68a can be acquired in shorter time in comparison with the ultraviolet microscope apparatus 100 which acquires the set values with the use of the observation image. Further, since the spectral characteristics of the microscope body 201 and the light source device 102 are measured by the spectrometer 62, the set values of the ND filters 34A to 34C can be acquired with a higher precision in comparison with the case where the observation image is utilized.

The set value (transmittance) of the ND filter 33 stored in the ND set value storage table 68a can be determined according to the number of combined wavelength regions for each combination pattern of wavelength regions, for example, similarly to the ND set value storage table 18a.

As described above, in the ultraviolet microscope apparatus 200 according to the second embodiment, the set value (transmittance) of each of the ND filter 33 and the ND filter 34A to 34C is determined with the use of the reference sample 10, and stored in the ND set value storage table 68a for each combination pattern of the first to the third wavelength regions, and the light source controller 19a makes the driving unit 13 change the setting of the ND filter 33 and the ND filters 34A to 34C based on each set value stored in the ND set value storage table 68a according to the wavelength designation information which designates the combination pattern of the wavelength regions of the ultraviolet light emitted from the light source device 102. In addition, the imaging parameter of the camera 14 determined based on the spectral sensitivity characteristic of the camera 14 is stored in the imaging parameter storage table 68b for each of the combination patterns according to which the ultraviolet light of each of the first to the third wavelength regions is emitted independently. The imaging controller 69b makes the camera 14 change the setting of imaging parameters based on each set value stored in the imaging parameter storage table 68b according to the wavelength designation information. As a result, the ultraviolet microscope apparatus 200 can always generate the observation image in the brightness corresponding to the spectral reflectance of the specimen 1 even when the wavelength region of the ultraviolet light emitted independently from the light source device 102 is changed, whereby the change in the pixel values of the observation image can be made to accurately correspond with the change in the reflectance of the specimen 1.

Further, in the ultraviolet microscope apparatus 200, each of the set values stored in the ND set value storage table 68a is previously determined so that the total light intensity of the ultraviolet light emitted from the light source device 102 as the illumination light is equal for each of the combination patterns of the wavelength regions, whereby the total light intensity of the ultraviolet light emitted from the light source device 102 can be maintained at a constant level. Thus, the ultraviolet microscope apparatus 200, similarly to the ultraviolet microscope apparatus 100, can prevent the damage on the specimen 1 and at the same time, can prevent the saturation of the observation image.

Exemplary embodiments of the present invention have been described as the first and the second embodiments. The present invention, however, is not limited to the first and the second embodiments, and can be modified in various manners without departing from the scope of the present invention.

For example, in the first and the second embodiments, the user acquires the set values to be stored in the ND set value storage tables 18a and 68a through manual operation based on the acquiring process procedures shown respectively in FIGS. 4 and 11. The manner of acquiring set values is not limited to the manual operation, however. It is possible to store control program for automatically executing the acquiring process in each unit in the storage unit 18 or 68, so that the control unit 19 or 69 executes the control program to realize a series of acquiring process. Further, the set values stored in the ND set value storage table 18a and 68a may be made appropriately correctable by the user or the like.

Further, in the first and the second embodiments, the set values stored in the ND set value storage tables 18a and 68a are described as the transmittance of the corresponding ND filter. The set value, however, is not limited to the transmittance. Alternatively, the set value may be a set value for the driving mechanism which drives each of the ND filters.

Still further, in the first and the second embodiments, the wavelength-selection unit 11 extracts the ultraviolet light of the first to the third wavelength regions. The number of wavelength regions of the extracted light is not limited to three, however, and the ultraviolet light of two, four, or more than four wavelength regions may be extracted. Still further, the wavelength region of the light extracted by the wavelength-selection unit 11 is not limited to the ultraviolet region, and can be a visible range, an infrared region, or a combination of these wavelength regions. Accordingly, the microscope apparatus according to the present invention is not limited to the ultraviolet microscope apparatus. The microscope apparatus according to the present invention can be an apparatus which is applicable, for example, to the visible range, the infrared region, or a wide range of wavelength regions ranging from the ultraviolet region to the infrared region.

In the first and the second embodiments, the microscope bodies 101, 201 are each described as an erecting microscope in which the specimen is observed from above. Each of the microscope bodies 101 and 201 may be an inverted microscope in which the specimen is observed from below. Further, though the microscope bodies 101 and 201 are described as an epi-illumination structure in which the light source device 102 irradiates the specimen with the illumination light from above, the microscope bodies 101 and 201 can be a transmission illumination structure.

The pixel value of the observation image in the present invention should be interpreted appropriately as a brightness value, gray value, gradation value, or intensity value, according to the type of observation image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope apparatus comprising:
    a light source device including a light intensity adjuster which changes light intensity of illumination light of plural different wavelength regions selectively extracted from light emitted from a light source, wherein the light source device emits the illumination light of the plural different wavelength regions such that a light intensity ratio of light of one wavelength region to light of another wavelength region is variable,
    a storage table which stores set values of the light intensity adjuster for each of a plurality of combination patterns of the wavelength regions of the illumination light emitted from the light source device,
    a setting controller which controls the light source device to change a setting of the light intensity adjuster based on the set values stored in the storage table according to wavelength designation information designating one of the combination patterns of the wavelength regions,
    a reference sample having a predetermined reflectance ratio between two different wavelength regions selectable from the plural different wavelength regions,
    an illumination unit which irradiates the reference sample with the illumination light of each of the different wavelength regions emitted from the light source device,
    an image forming unit which forms a reference optical image of the reference sample irradiated with the illumination light,
    an imager which captures the reference optical image of each of the different wavelength regions to generate a reference observation image, and
    an image processor which calculates a statistic value of pixel values of the reference observation image for each of the different wavelength regions,
    wherein the set values stored in the storage table are determined based on the predetermined reflectance ratio and the statistic value for each of the combination patterns of the wavelength regions.

2. The microscope apparatus according to claim 1, wherein the light intensity adjuster includes at least one wavelength-specific light intensity adjuster which changes the light intensity of light of one of the different wavelength regions included in the illumination light and a batch light intensity adjuster which changes the light intensity of the illumination light of all of the different wavelength regions collectively, wherein the storage table stores therein the set value of the at least one wavelength-specific light intensity adjuster and the batch light intensity adjuster for each of the combination patterns of the wavelength regions, and wherein the setting controller controls the light source device to change the setting of the at least one wavelength-specific light intensity adjuster and the batch light intensity adjuster based on the set value stored in the storage table according to the wavelength designation information.

3. The microscope apparatus according to claim 1, wherein the statistic value is one of an average value, a maximum value, a median value, and a mode value.

4. The microscope apparatus according to claim 1, wherein the storage table stores therein the set values according to which total light intensity of the illumination light emitted from the light source device is equal for all the combination patterns of the wavelength regions.

5. A microscope apparatus comprising:

a light source device including a light intensity adjuster which changes light intensity of illumination light of plural different wavelength regions selectively extracted from light emitted from a light source, wherein the light source device emits the illumination light of the plural different wavelength regions such that a light intensity ratio of light of one wavelength region to light of another wavelength region is variable, a storage table which stores set values of the light intensity adjuster for each of a plurality of combination patterns of the wavelength regions of the illumination light emitted from the light source device, a setting controller which controls the light source device to change a setting of the light intensity adjuster based on the set values stored in the storage table according to wavelength designation information designating one of the combination patterns of the wavelength regions, a reference sample having a predetermined reflectance ratio between two different wavelength regions selectable from the plural different wavelength regions, an illumination unit which irradiates the reference sample with the illumination light emitted from the light source device, an image forming unit which forms an image of a reference optical image of the reference sample irradiated with the illumination light, and a spectral measurement unit which measures spectral intensity distribution of observation light forming the reference optical image to calculate a statistic value of the spectral intensity distribution for each of the different wavelength regions, wherein the set values stored in the storage table are determined based on the predetermined reflectance ratio and the statistic value for each of the combination patterns of the wavelength regions.

6. The microscope apparatus according to claim 5, wherein the statistic value is one of an average value, a maximum value, a median value, and a mode value.

7. The microscope apparatus according to claim 5, further comprising:

an imager which captures an optical image formed by the image forming unit to generate an observation image, an imaging parameter storage table which stores an imaging parameter of the imager determined based on spectral sensitivity information of the imager for each of the different wavelength regions, and an imaging controller which controls the imager to change the imaging parameter based on the imaging parameter stored in the imaging parameter storage table according to the wavelength designation information.

8. The microscope apparatus according to claim 7, wherein the imaging parameter is one of a time of exposure and a gain of the imager.

9. A microscope apparatus comprising:

a light source device including a light intensity adjuster which changes light intensity of illumination light of plural different wavelength regions selectively extracted from light emitted from a light source, wherein the light source device emits the illumination light of the plural different wavelength regions such that a light intensity ratio of light of one wavelength region to light of another wavelength region is variable, a storage table which stores set values of the light intensity adjuster for each of a plurality of combination patterns of the wavelength regions of the illumination light emitted from the light source device, a setting controller which controls the light source device to change a setting of the light intensity adjuster based on the set values stored in the storage table according to wavelength designation information designating one of the combination patterns of the wavelength regions, wherein the light intensity adjuster includes at least one wavelength-specific light intensity adjuster which changes the light intensity of light of one of the different wavelength regions included in the illumination light, and a batch light intensity adjuster which changes the light intensity of the illumination light of all of the different wavelength regions collectively, wherein the storage table stores therein the set value of the at least one wavelength-specific light intensity adjuster and the batch light intensity adjuster for each of the combination patterns of the wavelength regions, and wherein the setting controller controls the light source device to change the setting of the at least one wavelength-specific light intensity adjuster and the batch light intensity adjuster based on the set value stored in the storage table according to the wavelength designation information, and wherein the light source device includes:

a light-collecting optical system which collects the light emitted by the light source to emit a parallel flux which is inclined relative to a light axis of the light-collecting optical system, a selective reflection optical system which selectively reflects the parallel flux of each of the plural different wavelength regions, a returning optical system which turns a reflected flux reflected by the selective reflection optical system and returns a turned flux which is symmetrical with the reflected flux about a reflected light axis of the selective reflection optical system for each of the different wavelength regions, and a shutter which selectively blocks and opens a light path of the reflected flux for each of the different wavelength regions, wherein the selective reflection optical system reflects again the turned flux emitted by the returning optical system, wherein the light-collecting optical system collects a re-reflected flux from the selective reflection optical system to form a light source image of the light source, wherein the at least one wavelength-specific light intensity adjuster is arranged in the light path of the reflected flux to change the light intensity of the reflected flux for each of the different wavelength regions, and wherein the batch light intensity adjuster is arranged at least in one of a first light path extending from the light source to the selective reflection optical system and a second light path extending from the selective reflection optical system to the light source image, to change light intensity of light passing through the first light path and the second light path.

10. The microscope apparatus according to claim 9, wherein:

the selective reflection optical system includes plural selective reflection elements that selectively reflect the parallel flux of one wavelength region among the plural different wavelength regions and transmit the parallel flux of wavelength regions other than the one wavelength region, and the returning optical system is arranged on a reflected light axis of the selective reflection element for each of the different wavelength regions to turn the reflected flux reflected by the selective reflection element symmetrically about the reflected light axis corresponding to the reflected flux.

11. A microscope apparatus comprising:

a light source device which selectively emits an illumination light of plural different wavelength regions;

an illumination unit which irradiates a specimen with the illumination light;

an image forming unit which forms an optical image of the specimen irradiated with the illumination light;

an imager which captures the optical image to generate an observation image;

an imaging parameter storage table which stores at least one of a time of exposure and a gain of the imager determined based on spectral sensitivity information of the imager for each of the different wavelength regions;

an imaging controller which controls the imager to change at least one of the time of exposure and the gain based on at least one of the time of exposure and the gain stored in the imaging parameter storage table according to wavelength designation information designating a wavelength region of the illumination light emitted from the light source device.

* * * * *